US006999274B2

(12) United States Patent
Beck et al.

(10) Patent No.: US 6,999,274 B2
(45) Date of Patent: Feb. 14, 2006

(54) SERVO HEAD FOR MAGNETIC TAPE

(75) Inventors: Patricia A. Beck, Palo Alto, CA (US); Paul W. Poorman, Meridian, ID (US); George M. Clifford, Jr., Los Altos Hills, CA (US); Richard H. Henze, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/256,572

(22) Filed: Sep. 27, 2002

(65) Prior Publication Data

US 2003/0030939 A1 Feb. 13, 2003

Related U.S. Application Data

(60) Continuation of application No. 09/791,903, filed on Feb. 22, 2001, now Pat. No. 6,647,613, which is a division of application No. 09/449,010, filed on Nov. 24, 1999, now Pat. No. 6,229,669, which is a division of application No. 08/959,509, filed on Oct. 28, 1997, now Pat. No. 6,018,444.

(51) Int. Cl.
    *G11B 5/187* (2006.01)

(52) U.S. Cl. ............... 360/122; 360/119; 360/121; 360/125

(58) Field of Classification Search ............... 360/119, 360/120, 121, 122, 125, 126, 128; 29/603.07
    See application file for complete search history.

(56) References Cited

U.S. PATENT DOCUMENTS

| 3,414,895 | A | * | 12/1968 | Allen, Jr. ............... 360/122 |
| 4,285,019 | A | * | 8/1981 | Scott et al. ............ 360/122 X |
| 4,967,301 | A | * | 10/1990 | Lopez et al. ............ 360/128 |
| 5,214,553 | A | * | 5/1993 | Kan et al. ............... 360/122 |

FOREIGN PATENT DOCUMENTS

EP    0 690 442    *    1/1996

* cited by examiner

*Primary Examiner*—A. Dexter Tugbang

(57) ABSTRACT

A servo head for magnetic tape is provided. The head includes a substantial planar head surface. The head includes a leading edge that is disposed adjacent to the head surface such that the tape contacts the leading edge before passing over the head surface. The leading edge includes a rounded portion so as to form an air bearing between the head surface and the tape. The leading edge can include an abrupt change in slope at the leading edge. Alternatively, the leading edge can include a smooth transition.

6 Claims, 8 Drawing Sheets

SERVO HEAD FOR MAGNETIC TAPE

RELATED APPLICATIONS

This application is a continuation of application Ser. No. 09/791,903, filed on Feb. 22, 2001 now U.S. Pat. No. 6,647,613, which is a divisional of application Ser. No. 09/449,010, filed on Nov. 24, 1999, now U.S. Pat. No. 6,229,669, which is a divisional of application Ser. No. 08/959,509, filed on Oct. 28, 1997, now U.S. Pat. No. 6,018,444.

BACKGROUND OF THE INVENTION

1. Field of the Invention

The present invention relates generally to recording and reading data from magnetic storage media and, more particularly, to an improved magnetic write head design for writing timing-based servo patterns on flexible magnetic storage media.

2. Description of the Related Art

Servo control systems that maintain the position of a magnetic head relative to tracks in magnetic storage media are well known. European Patent Application EP 0 690 442 A2, published Jan. 3, 1995, entitled "Servo Control System", Albrecht et al., describes a servo control system having a magnetic recording head for writing servo position code across the width of the magnetic recording tape and down the length of the tape. The head also has multiple gaps in the down-the-tape direction. The head can write a pattern along the length of the tape wherein the pattern contains multiple gaps spaced across the width of the tape. The advantage of such a recording head is the ability to write servo code along the entire length of the tape in discrete areas (bands) across the entire width of the tape in a single pass. This increases position accuracy of one pattern with respect to another. This also provides a huge economic advantage because writing each band separately would be significantly more expensive.

As shown in section in FIG. 1, a typical prior art head 100 is fabricated from two parallel pieces of ferrite 110 separated by a layer of glass 120. The top surface of the ferrite-glass-ferrite head 100 is curved, defining the contact surface of the tape. This curved surface is covered first with a thin magnetic seed layer 140 and then later with a layer 130 of magnetic material several microns thick. Gaps 150 defining the writing pattern extend through the magnetic layer 130 to the seed layer 140 over the central glass region. A wire winding 160 with one or more turns passes through a groove 170 in the ferrite extending across the long axis of the head 100 next to the glass. Current passing through the wire 160 energizes magnetic fields in the gaps 150. The magnetic field writes the gap pattern on the passing tape (not shown). Contact between the passing tape and the head causes wear to both the tape and the head thereby decreasing the life of both.

Using the prior art approach, each head 100 must be fabricated individually (i.e., discretely). The small size and shape of the discrete heads makes it difficult to apply a photoresist layer that has a uniform thickness. Forming a uniform photoresist layer is an especially important consideration because the photoresist is used to pattern the recording gaps. Photoresist thickness non-uniformity directly and adversely affects the quality of the patterns, especially for narrow gap dimensions. Such patterns require the formation of narrow lines (on the order of 1.5 µm). The potential for decreased linewidth will permit a more efficient write and more precise position signal, improving servo control. Also, because the surface is curved, one must compensate for the curvature of the head in the photolithographic process. It is particularly difficult to apply an even layer of photoresist to pattern the recording gaps on this curved surface. Applying resist by spinning is difficult in the case where the length-to-width ratio of a part is far greater than unity. Although resist can be electroplated, dipped or sprayed onto the part, these methods are cumbersome and have not been refined for submicron geometric tolerances.

To produce this rounded shape, the heads must be individually machined although they could be produced in bar form to reduce fabrication costs. FIG. 2 illustrates a bar 200 containing several heads 100. Lines 210 perpendicular to the long axis indicate where the bars could be sawed apart to form individual heads 100. Although the bars 200 can be cut up into several heads 100, the procedure is still not very efficient and provides identical or even more difficult challenges to achieving photoresist uniformity.

Thus, it can be seen that multiple gap servo write heads cause wear to the heads and to the tape, are expensive to manufacture, have limited servo pattern definition, and hinder the use of magnetic storage devices in many applications.

Therefore, an unresolved need exists for a batch fabrication technique that will increase the manufacturing efficiency of servo write heads and also improve servo pattern definition for fine features while reducing tape and head wear.

SUMMARY OF THE INVENTION

A batch fabrication technique is described that increases the manufacturing efficiency of servo write heads and also improves servo pattern definition for fine features, while reducing tape and head wear. Multiple heads are fabricated as a batch from one or more ferrite wafers. A nominally flat, large wafer surface and a contour suitable for uniform photoresist application and planar photolithography permit fine servo pattern definition. A rounded leading edge on the head creates an air bearing to reduce wear of the tape and of the head. Moreover, any head wear occurs at the leading edge rather than in the region of the head where the servo pattern is formed.

According to one aspect of the invention, the servo write head has a substantially planar head surface. A leading edge is disposed adjacent to the head surface such that the tape contacts the leading edge before passing over the head surface. In a preferred embodiment, the leading edge is rounded to form an air bearing between the head surface and the tape. A rounded trailing edge may be disposed adjacent to the head surface such that the tape passes over the trailing edge after passing over the head surface. Either of the leading or trailing edges may be rounded through blending, grinding or faceting from the head surface.

The head can advantageously permit single pass recording of servo data over the width and length of the tape. A head as described will experience reduced wear of the magnetic recording region of the head. In a preferred embodiment, the geometry of the head will cause low contact pressure on tape at the edges of head so that any wear occurring at edges of the head will be reduced and head life will be extended.

According to another aspect of the invention, the head is formed from an upper ferrite wafer having a non-magnetic spacer. Non-magnetic material is photolithographically defined to produce gaps above the spacer. The non-magnetic material may be photoresist, semiconductor materials, glass, metal or the like. The material may even be removed later to leave air gaps. The non-magnetic material forms a region where the field loops out to intersect the passing tape, thereby transferring a magnetic pattern to tape. The defined gap pattern may differ from the pattern written to tape. By appropriate choice of gap pattern, the servo pattern may be enhanced. An additional non-magnetic space can be formed in the back of the upper ferrite wafer proximate to the spacer to enhance the magnetic circuit. Additionally, a lower ferrite wafer may be mated to the upper ferrite wafer to complete a magnetic circuit around the gaps. An inductive winding may pass through a channel in the ferrite or spacer. Multiple heads may be formed through batch processing of the upper and lower ferrite wafers.

Furthermore, the design of the head is such that the head can be readily made through batch fabrication. Moreover, the head will permit fabrication with increased process control as well as increased general dimensional control. The potential for decreased linewidth will permit a more efficient write and more precise position signal, improving servo control. The write efficiency is further enhanced through completion of a magnetic circuit around the gaps.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–14. Those skilled in the art will readily appreciate that the detailed description given herein with respect to these figures is for explanatory purposes, however, because the invention extends beyond these limited embodiments.

The present invention is intended to be used for writing position servo information on magnetic tape in a manner similar to the head described by Albrecht et al., in European Patent Application EP 0 690 442 A2, supra.

Figure 3:
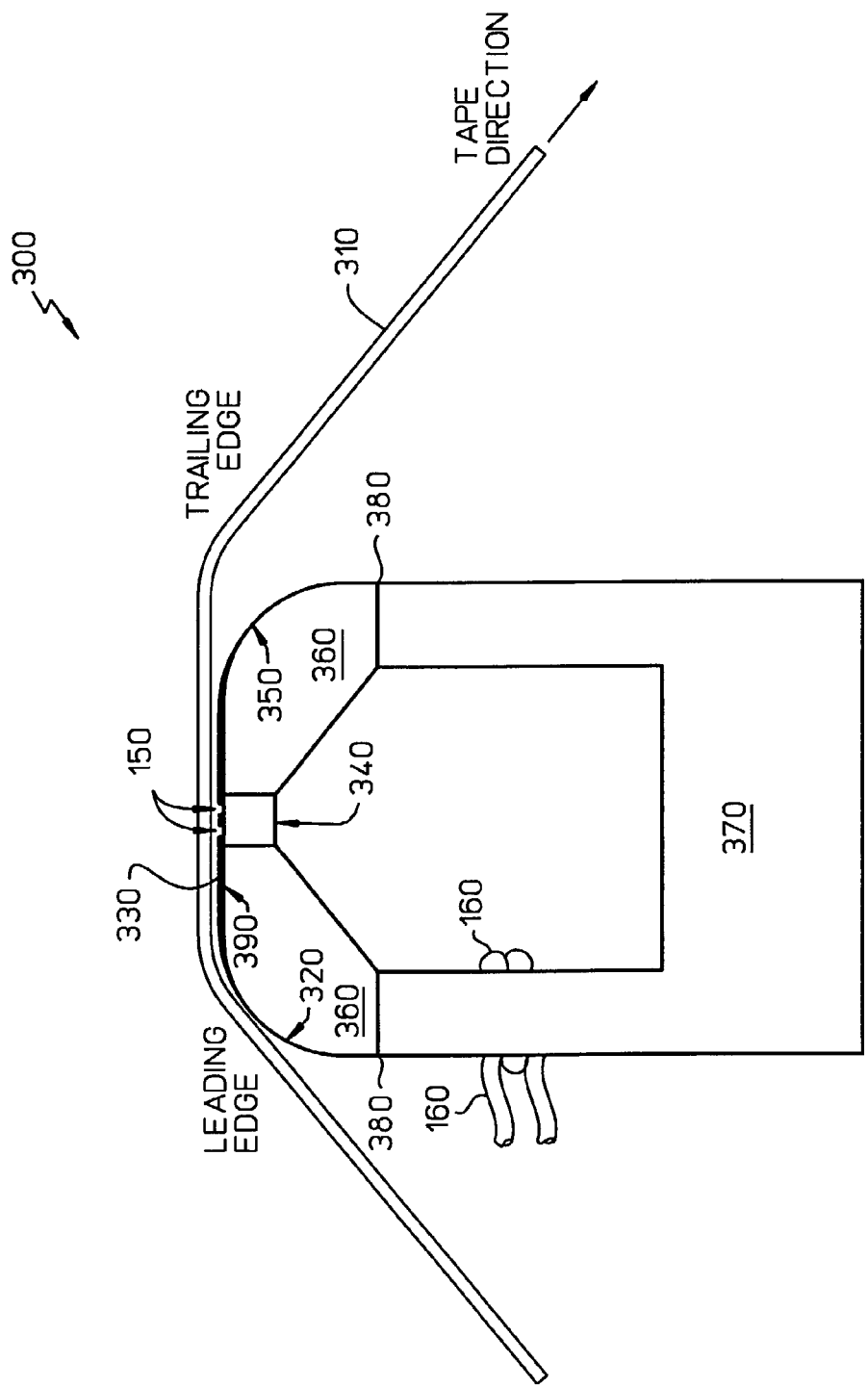
FIG. 3 is a drawing illustrating a cross section of a servo write head according to the present invention, with recording tape passing over the head.

FIG. 3 is a drawing illustrating a cross section of a servo write head 300 with recording tape 310 passing over the head 300 according to one embodiment of the present invention. The tape 310 first contacts the head 300 on the curved surface 320 located at the leading edge of the head 300. Tape 310 continues over the flat surface 330 supported by an air bearing which has formed between the tape 310 and the head surface 330.

To replicate the servo code on the tape 310, magnetic gap 150 (or gaps) is located in a desired pattern near the center of the head 300. These patterns can be photolithographically defined or etched in a thin (on the order of a few $\mu$m) layer 390 of high moment magnetic material (such as iron aluminum nitride (FeAlN), FeTaN or NiFe), deposited over a non-magnetic spacer 340.

The tape 310 continues to the opposite edge of the head, exiting the head over a trailing curved edge 350 similar to the entrance. For one embodiment, the angle of the tape 310 relative to the top surface 330 of the head 300 is approximately 1–2 degrees. The edges 320 and 350 are shaped with a preferred radius of 0.5–2.0 mm.

For one embodiment, there is a smooth transition to the flat surface 330 on the top of the head 300 at edges 320 and 350. Alternately, the rounded edges 320 or 350 can be formed so that there is an abrupt change in slope at the edge of the flat surface 330. That is to say, for example, that a radius cutter depth can be set so that the radius centerline is closer to the flat surface than the value of the radius.

This rounded edge geometry allows the tape 310 to pass over the two edges 320 and 350 with a low contact pressure and proceed over the flat portion 330 of the head 300 separated from the surface by a thin air bearing. The fact that the tape 310 is separated from the head 300 means that the head 300 will wear less in the vicinity of the spacer 340 and there will be less material transferred between head 300 and tape 310. The spacing between the flat portion 330 of the head 300 and the tape 310 is controlled by the choice of radius, tape tension, tape speed and tape characteristics. Small head-tape spacing (preferred for good pattern transfer) is maintained by minimizing the amount of air that is entrapped between the tape 310 and the leading edge 320 of the head 300.

As the tape 310 comes in contact with the head 300 at the leading edge 320, most of the air that clings to the tape is prevented from being carried into the air bearing region. This leading edge 320 incorporates a small radius at the tape-entrance point. Although a sharp edge would serve the same purpose, it would result in extremely high contact pressure between the tape 310 and head 300 and thus result in damage to the tape 310. In addition, so much air would be excluded from the interface that the tape would contact the head across the entire surface, thus increasing wear. By selecting an appropriately small radius in the design, the contact pressure is minimized while still excluding a large amount of air from being carried into the air bearing region.

Like the prior art, an embodiment of the invention includes a spacer 340 region where a non-magnetic material (such as glass) separates two pieces of ferrite 360 by, for example, a distance of 100–500 microns. The magnetic flux produced by the write-current is then largely confined to the magnetic layer 390 deposited on the top surface 330 of the head 300. This material 390 (having pattern-writing gaps 150) extends over the flat top of the non-magnetic material 340 and ferrite 360 and can extend over the curved edges 320 and 350.

Figure 1:
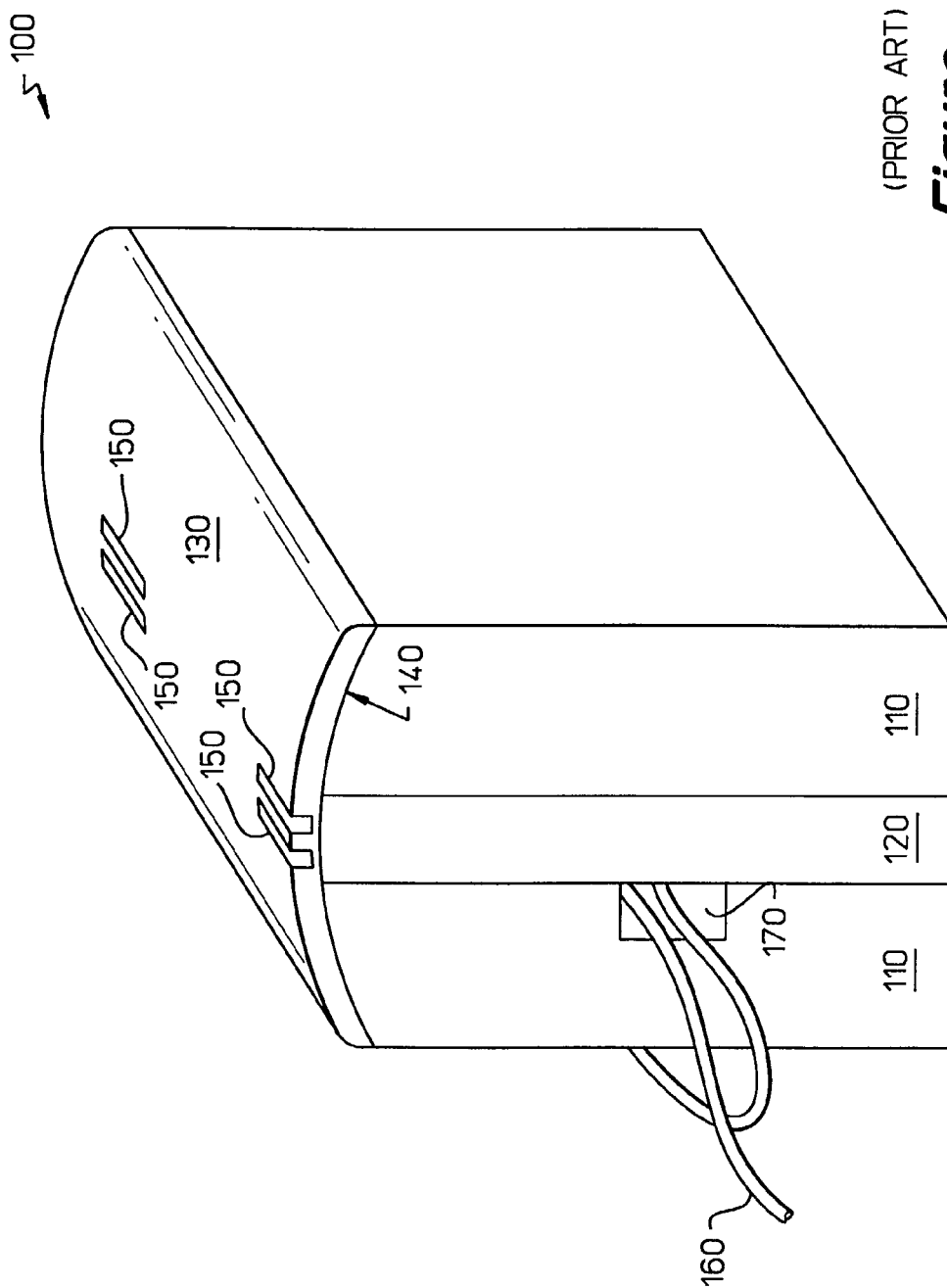
FIG. 1 is a drawing illustrating a prior art ferrite-glass-ferrite head used for writing position servo information on magnetic tape.
Figure 2:
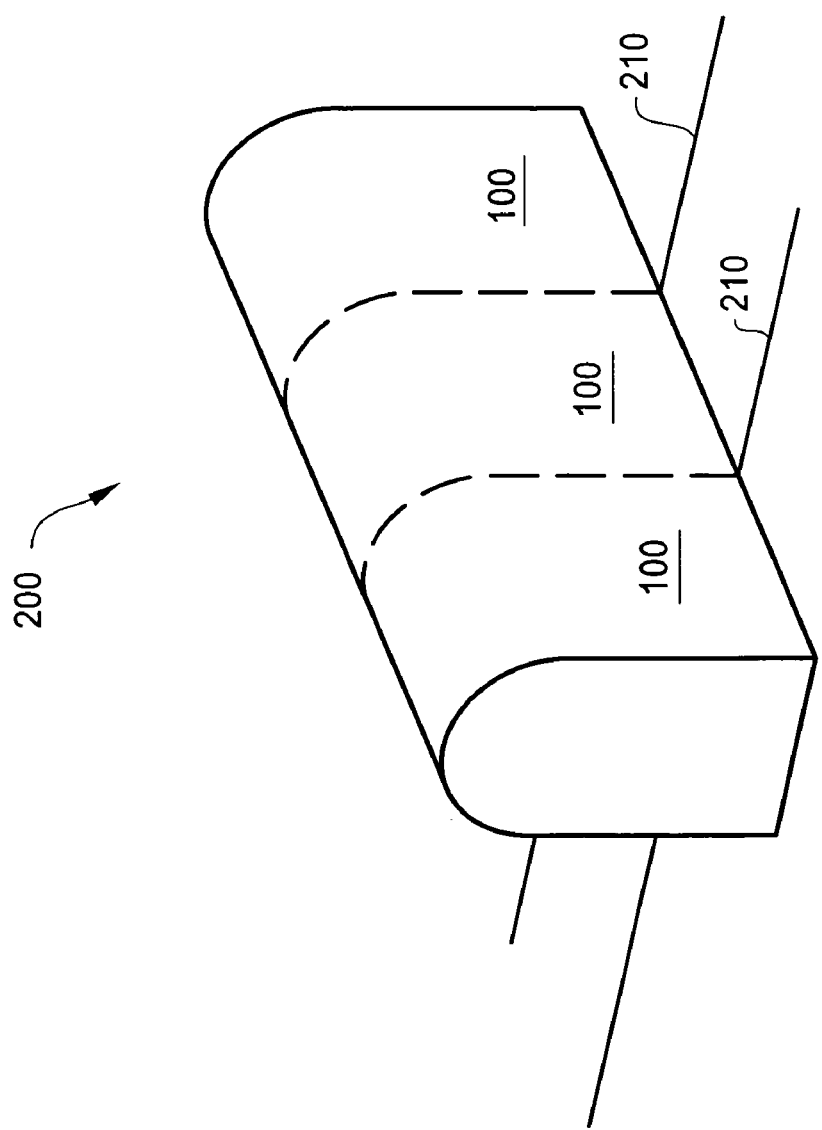
FIG. 2 is a drawing illustrating a bar containing several servo write heads similar to those of the prior art, with lines perpendicular to the long axis indicating where the bars could be sawed apart to form individual heads.

Unlike the prior art, for one embodiment of the invention, the ferrite 360 is not completely split into two halves by the non-magnetic material as in FIG. 1, but rather has a non-magnetic spacer 340 only in the vicinity of the gap 150 (as shown in FIG. 3). Thus, spacer 340 does not extend to the bottom of the head for this embodiment.

Windings 160 are wrapped around either side of bottom portion 370 of head 300. Alternately, windings 160 can be wrapped around the bottom of bottom portion 370, or wrapped around the top portion 360.

Figure 4:
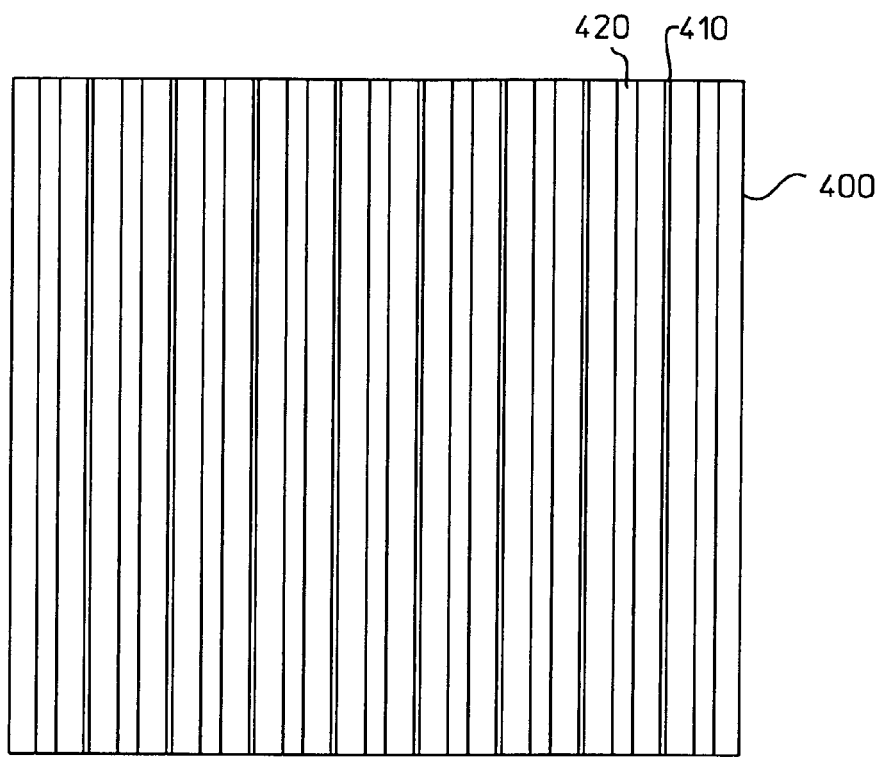
FIG. 4 is a drawing illustrating the top view of an upper ferrite wafer for batch fabrication of servo write heads according to one embodiment of the present invention.
Figure 5:
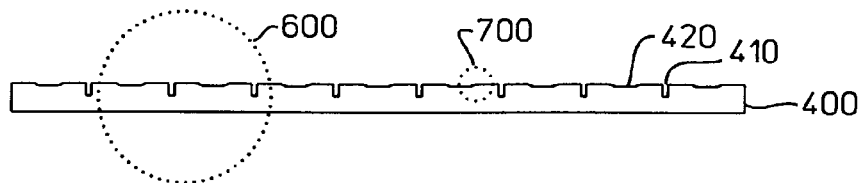
FIG. 5 is a drawing illustrating the side view of the upper ferrite wafer of FIG. 4.

The magnetic head of the invention can be batch-fabricated on ferrite wafer-like slabs (which are square or round to provide maximum yield, however other shapes are possible, but not as efficient) using photolithography to define the gaps 150 described earlier. FIG. 4 is a drawing illustrating the top view of an upper ferrite wafer 400 for batch fabrication of servo write heads. FIG. 5 is a drawing illustrating the side view of upper ferrite wafer 400. One embodiment of the invention uses a flat surface in the region of the magnetic gaps, allowing many heads to be laid out efficiently on a large ferrite and glass (or other non-magnetic material such as ceramic) wafer. The glass can be added by one of several methods. Grooves 410 can be cut in upper ferrite wafer 400, filled with glass frit, and remelted. If suitably small, the grooves 410 may be filled by other non-magnetic material known in the semiconductor industry such as ceramic and polished back in a damascene process. Preferably, the top surface is suitably flat and polished.

Figure 12:
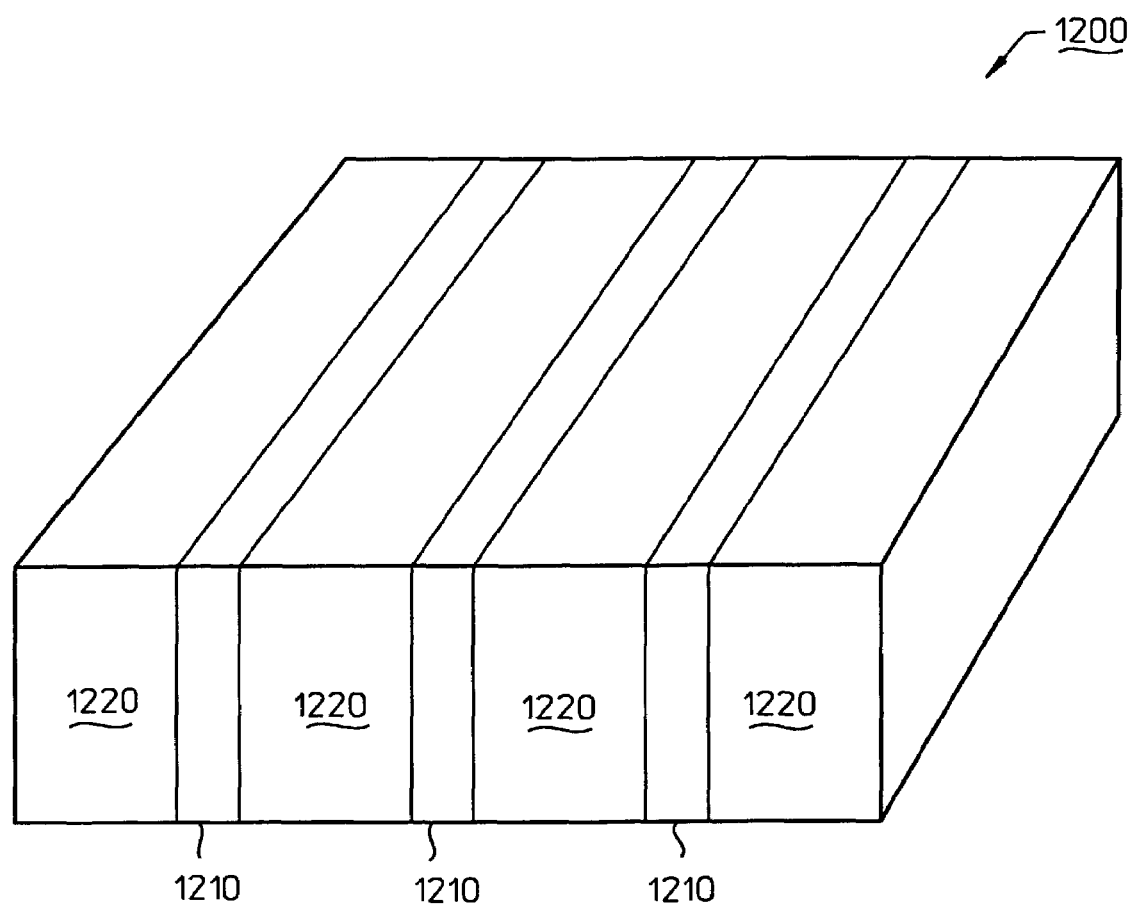
FIG. 12 is a drawing illustrating a block of alternating layers of non-magnetic material and ferrite according to an alternate embodiment of the present invention.

Alternately, a sandwich 1200 of non-magnetic material 1210 and ferrite 1220 as shown in FIG. 12 can be built. Thus, at its simplest, the wafer is one piece of ferrite/glass/ferrite which has been put together "butcher-block" style as shown in FIG. 12. Photolithography, magnetic material deposition and the like are performed on the resulting "butcher-block", which is cut-apart, and contoured if needed, to form individual heads with a non-magnetic spacer within ferrite. It is also possible to build a tall "butcher-block", which is then cut into slabs to be processed as the shorter, single-slab "butcher-block" just described.

Figure 13:
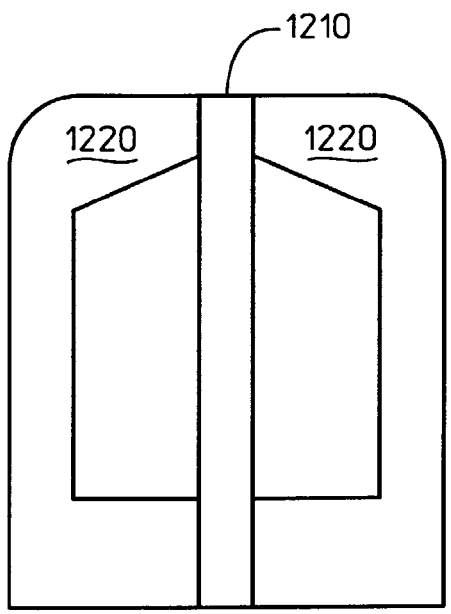
FIG. 13 is a drawing illustrating alternating layers of non-magnetic material and contoured ferrite according to an alternate embodiment of the present invention.

Alternately, the shape of the structure can be defined before lamination. FIG. 13 is a drawing illustrating a head formed as in FIG. 12 wherein the head has alternating layers of non-magnetic material 1210 and contoured ferrite 1220 according to an alternate embodiment of the present invention. Note that although FIG. 13 shows ferrite layers 1220 to be symmetric about non-magnetic layer 1210, alternately, ferrite layers 1220 can be asymmetric and non-magnetic material need not extend all of the way to the bottom of the part.

Figure 6:
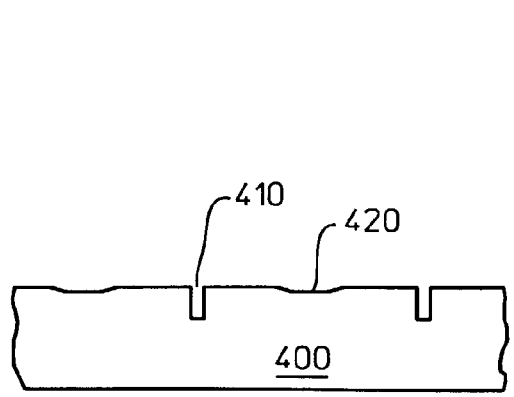
FIG. 6 is a drawing illustrating enlarged portion 600 of the FIG. 5 side view of the upper ferrite wafer.
Figure 7:
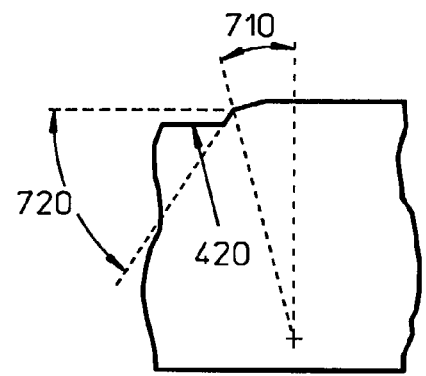
FIG. 7 is a drawing illustrating enlarged portion 700 of the FIG. 5 side view of the upper ferrite wafer.

The edges of these heads can be defined by machining a series of shallow grooves 420 on the surface of the ferrite wafer parallel to the glass-filled grooves 410. FIG. 6 shows shallow grooves 420 and glass-filled grooves 410 in enlarged portion 600 of FIG. 5. Similarly, FIG. 7 shows one side of shallow groove 420 in enlarged portion 700 of FIG. 5. A radius or other rounded edge can be applied to these edges by a variety of techniques such as blending, grinding or faceting. Blending involves the breaking of an edge with lapping paper or similar procedure. Grinding (or machining) is achieved using a defined shape (i.e., a specially formed shape). Faceting is a technique wherein a series of small cuts are made at progressively greater angles.

Because the tape wraps around only a few degrees of the leading and trailing edges (where a radius has been introduced), the radius and resultant grooves need be machined only to a depth of tens of microns or less. The exact machining depth depends on the desired radius, the wrap angle of the tape and upon manufacturing considerations. For one embodiment, it is machined to a depth of about 50 $\mu$m to get a better polish on the sides. For this embodiment, angle 710 is between 5 and 15 degrees, and angle 720 is approximately 45 degrees. In order to make curved leading and trailing edges, it may be desired to machine deeper grooves along the edge of each head. However, deeper grooves pose a more difficult photoresist application problem. Thus, a more planar structure is desirable. In such a case, filling (in whole or in part) or covering the grooves with material (or otherwise using material to span the groove) will allow more uniform photoresist application.

Batch processing many heads on a wafer that has shallow grooves permits one to apply a uniform photoresist layer. The uniform photoresist layer, in turn, helps in defining accurately formed gaps in the magnetic layer above the non-magnetic spacer to thereby record a precise servo pattern on the tape. When spun, the fluid photoresist flows over the flat surfaces of the ferrite slab at a uniform thickness. The shallow depth, relatively wide width and inclined side walls allow the fluid photoresist to follow the contour of the grooves and move radially outward, instead of puddling or flowing around sharp discontinuities. Alternately, the lithography and depositions can be performed on a flat surface before the contours are formed.

Precise linewidth control enables precise servo patterns which are crucial to future improvements in track density. The flat surface in the vicinity of the gaps also allows a sharp image of the mask to be projected over the entire gap area when exposing the photoresist.

Standard semiconductor masks can optimally image a pattern only on a flat surface (even steppers assume a locally flat surface): The head in the prior art has a large cylindrical surface, limiting precise photolithographic exposure to the apex of the cylindrical surface. The linewidth variation should be +/−0.5 $\mu$m or less. As the pattern spreads farther from the apex, linewidth control becomes more challenging. Either the lateral width of the pattern that can be imaged on the surface must be severely limited or steps must be taken to compensate for the changes.

Biasing the mask differentially (varying the line width of the gap on the mask over the mask area to accommodate changing process parameters such as the varying distances from the flat mask to the curved head surface) is cumbersome, imprecise and assumes the curve of the surface is exactly the same from time to time. Curved surfaces are more difficult to grind and polish repeatably than flat surfaces.

With the flat surface of the invention, differential biasing of the mask is unnecessary and standard photolithographic imaging techniques, whether projection, direct write or contact, will minimize linewidth variation and increase process uniformity and repeatability. Variations can be reduced to 0.1 μm or less. Furthermore, manufacturing efficiency is achieved because the magnetic layer can be deposited over the whole wafer 400 at once (not just over an individual part).

Figure 11:
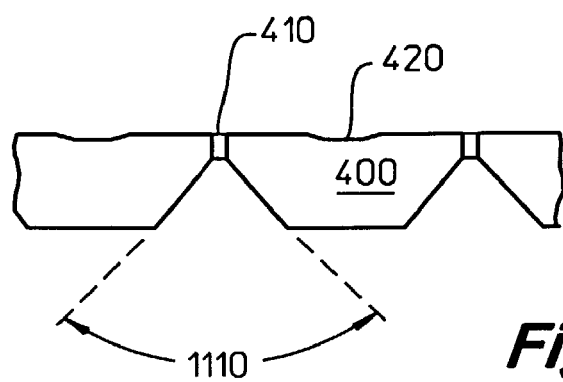
FIG. 11 is a drawing illustrating enlarged portion 1100 of the FIG. 10 side view of the upper ferrite wafer.

Moreover, the bottom of upper ferrite wafer 400 can be machined away to a suitable thickness. If the non-magnetic spacer of groove 410 does not extend to the bottom of the wafer, the ferrite can be machined until the separator is exposed. As shown in FIG. 11 (which is an enlarged drawing of portion 1100 of FIG. 10), angled grooves 430, creating additional non-magnetic space, can be machined in the bottom of the upper ferrite wafer 400, running parallel to the separation grooves, to enhance the efficiency of the magnetic circuit and expose the separator. For one embodiment angle 1110 is approximately 90 degrees. Alternately, the grooves can be rectangular.

As is known in the industry, a thin wear layer can be deposited on the surface of the head over which the tape passes. This wear layer can be employed even though an air bearing is formed between the head and the tape for some embodiments of the present invention. The magnetic layer has minimal impact on the ability to write because the layer is so thin.

Figure 14:
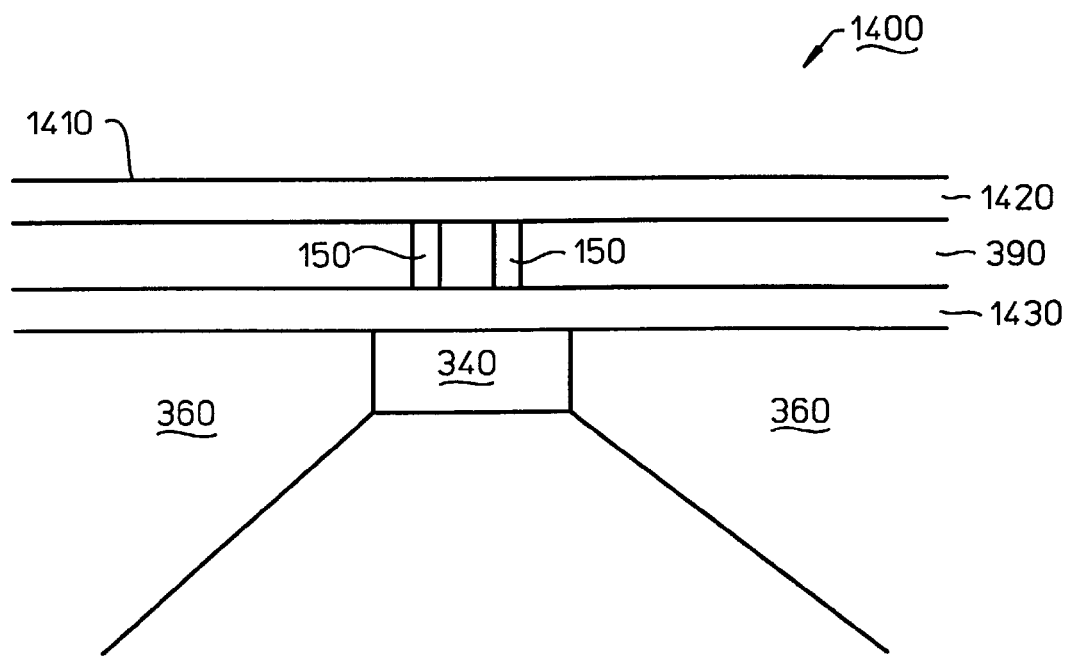
FIG. 14 is a drawing illustrating an upper head portion formed having a wear layer and an additional thin layer according to an alternate embodiment of the present invention.

FIG. 14 is a drawing illustrating an upper head portion 1400 formed having a wear layer 1420 and an additional thin soft magnetic or non-magnetic layer 1430 according to an alternate embodiment of the present invention. For this embodiment, a thin (i.e., preferably on the order of 1000 Angstroms) layer 1430 is formed between the ferrite layer 360 (which has non-magnetic spacer 340) and FeAlN layer 390 (which has photoresist gaps 150). Thin layer 1430 has been found to be advantageous because it coats or fills to thereby smooth out the surface of the materials. Additionally, if it is electrically conductive, the thin layer 1430 aids inspection (e.g, by Scanning Electron Microscope). Note that wear layer 1420 is formed over the FeAlN layer 390 and photoresist gaps 150. An added benefit of adding wear layer 1410 is that surface 1410 can be made smooth with no gap material 150 exposed to the tape.

Figure 8:
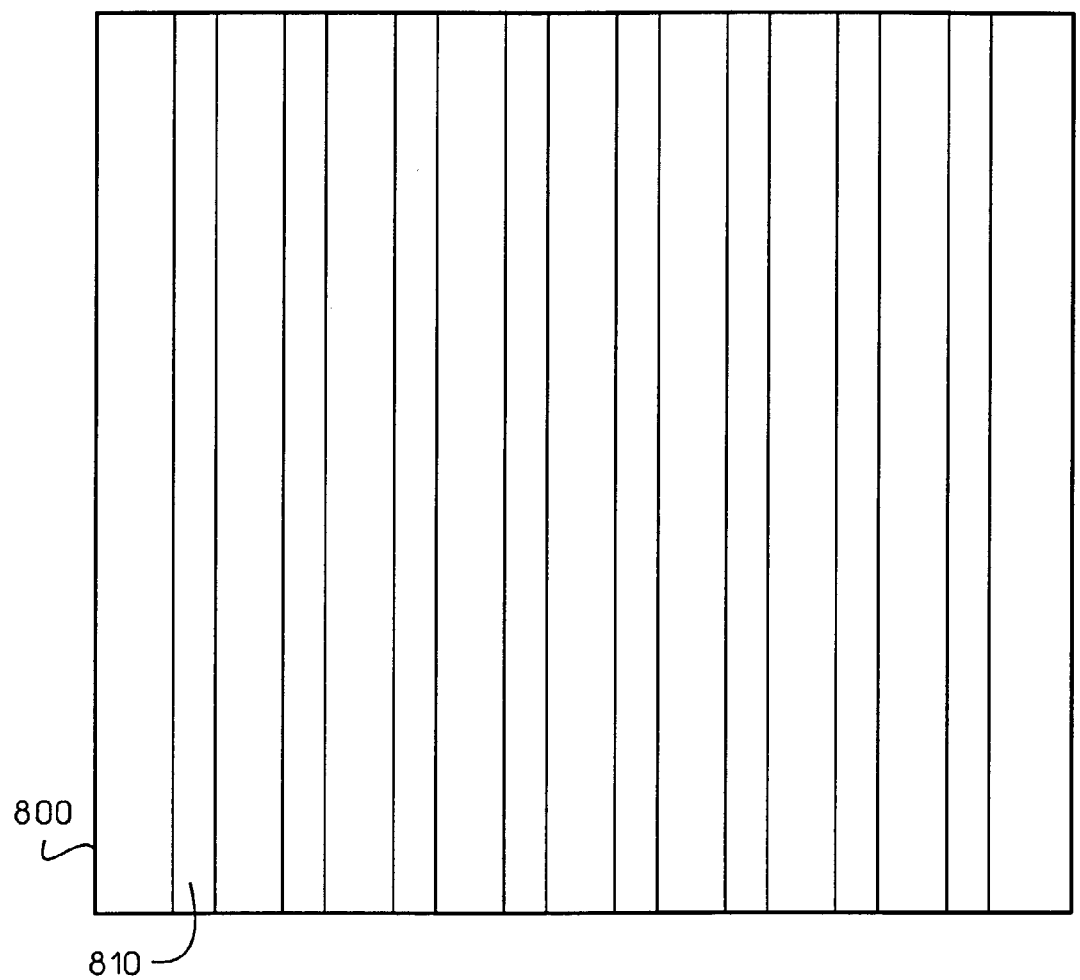
FIG. 8 is a drawing illustrating the top view of a lower ferrite wafer for batch fabrication of servo write heads according to one embodiment of the present invention.
Figure 9:
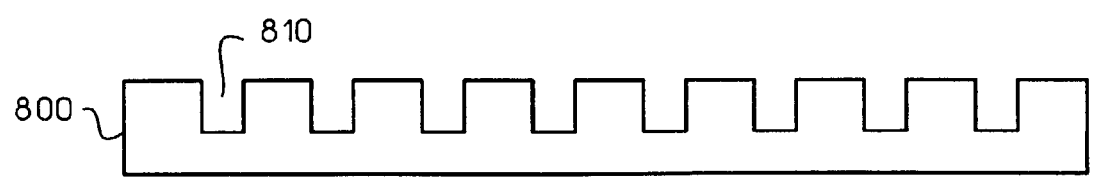
FIG. 9 is a drawing illustrating the side view of the lower ferrite wafer of FIG. 8.
Figure 10:
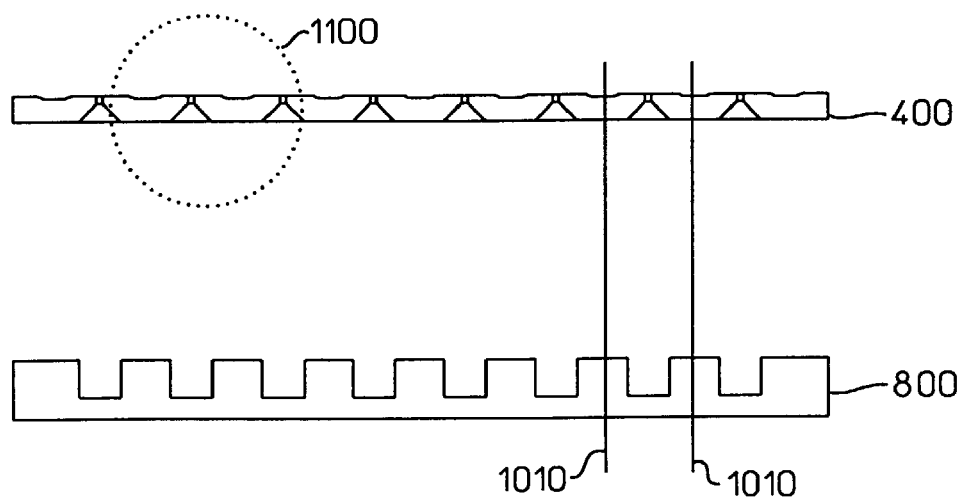
FIG. 10 is a side view drawing illustrating the mating of the upper ferrite wafer of FIG. 5 to the lower ferrite wafer of FIG. 9 for batch fabrication of servo write heads according to one embodiment of the present invention.

As shown in FIG. 8 (top view) and FIG. 9 (side view), channels 810 are machined into a lower ferrite wafer 800. The top of lower wafer 800 is mated to the bottom of upper wafer 400 (containing the photolithographic pattern) as shown in FIG. 10. After wafers 400 and 800 are bonded together, the laminated structure is sawed along the edge grooves 1010 as shown in FIG. 10 to become bars, and then sawn cross-wise to become individual heads 300.

Alternately, to increase handling strength, the structure may be created and bonded together before the lithography is performed.

For yet another embodiment, the head is formed with non-contoured, contoured or precontoured parts as shown in FIG. 12; or is formed using only an upper wafer similar to upper wafer 400 but with provisions for a winding, i.e., without adding lower wafer 800. In the case of a non-contoured flat wafer, the leading and trailing edge feature can be fabricated after separating the "butcher-block" into bars or individual heads.

Referring again to FIG. 3, the channel of the bottom half 370 becomes a passage (air-space) extending lengthwise down the center of the head 300, perpendicular to the travel direction of tape 310. Wire 160 is wrapped through the hole and around the outside of the core to form toroidal turns that energize the magnetic circuit when current is applied, similar to the prior art. However, the magnetic circuit of the present invention is more efficient than that of the prior art. This is because there is a continuous magnetic path of ferrite (except for the thin bonding lines) extending from one side of the thin magnetic top layer to the other. A small shunt of magnetic material can connect portions 360 directly above or beneath non-magnetic spacer 340 without rendering the head inoperable, however, such a shunt below magnetic spacer 340 is not preferred. On the other hand, the addition of magnetic portion 370 is especially advantageous over the prior art because it completes the magnetic circuit which includes portions 360. Moreover, some or all of the open central area bounded by portions 340, 360 and 370 may be filled in by the addition of a non-magnetic material such as glass (e.g., to add structural support).

For yet another embodiment, the rounded edges of the head are formed by adding layers of material to the head surface to approximate the desired cross section.

Thus a servo write head for magnetic tape has been described. The head can advantageously permit single pass recording of servo data. A head geometry as described will experience reduced wear of the magnetic recording region of the head, and will cause a low contact pressure on the tape at the edges of the head so that the wear will be reduced and the head life extended.

Furthermore, the design of the head is such that the head can be readily made through batch fabrication. Moreover, the head will permit fabrication with increased process control as well as increased general dimensional control. The potential for decreased linewidth on a flat surface will permit a more efficient write and more precise servo control. The write efficiency is further enhanced over prior art through completion of the magnetic circuit.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. A servo write head for magnetic tape, the head comprising:
    a substantially planar head surface;
    a gap located within the planar head surface;
    a leading edge, the leading edge being disposed adjacent to the head surface such that when in operation, the tape continuously contacts the leading edge before passing over the head surface, the leading edge being rounded so as to form an air bearing between the head surface and the tape, the air bearing preventing the tape from making contact with the gap;
    a trailing edge, the trailing edge being disposed adjacent to the head surface such that when in operation the tape passes over and bends around the trailing edge after passing over the head surface, the trailing edge being rounded; and wherein
    the air bearing prevents the tape from simultaneously contacting the leading edge and the trailing edge.

2. The head as set forth in claim 1, wherein the rounding of the
    leading edge is accomplished through a selected one or more of blending, grinding, machining, and faceting to the head surface.

3. The head as set forth in claim 1, wherein the rounding of the
trailing edge is accomplished through a selected one or more of blending, grinding, machining, and faceting from the head surface.

4. The head as set forth in claim 1, further comprising the leading edge comprising an abrupt change in slope at the leading edge.

5. The head as set forth in claim 1, further comprising the leading edge comprising a smooth transition.

6. A servo write head and magnetic tape assembly, the assembly comprising:
a magnetic tape that passes over the write head;
the write head comprising:
a substantially planar head surface;
a gap located within the planar head surface;
a leading edge, the leading edge being disposed adjacent to the head surface such that when in operation, the tape continuously contacts the leading edge before passing over the head surface, the leading edge being rounded so as to form an air bearing between the head surface and the tape, the air bearing preventing the tape from making contact with the gap;
a trailing edge, the trailing edge being disposed adjacent to the head surface such that when in operation the tape passes over the trailing edge after passing over the head surface, the trailing edge being rounded; and wherein
the air bearing prevents the tape from simultaneously contacting the leading edge and the trailing edge.

* * * * *